United States Patent

[11] 3,565,180

[72] Inventors Loren G. Arnold
 Rock Island;
 Orey W. Oerman, Moline, Ill.
[21] Appl. No. 482,824
[22] Filed Aug. 26, 1965
[45] Patented Feb. 23, 1971
[73] Assignee Deere & Company
 Moline, Ill.

[54] PLOW CONSTRUCTION
 16 Claims, 7 Drawing Figs.
[52] U.S. Cl. .................................................. 172/265
[51] Int. Cl. ...................................................... A01b 61/04
[50] Field of Search .......................................... 172/261,
 264, 265, 266, 267, 268, 710

[56] References Cited
 UNITED STATES PATENTS
3,032,122 5/1962 Geurts .......................... 172/264

2,379,779 7/1945 Ash ............................. 172/605
3,042,122 7/1962 Anderson ..................... 172/265
3,302,728 2/1967 Sullivan et al. ............... 172/265
 FOREIGN PATENTS
1,307,222 9/1959 U.S.S.R. ....................... 172/261

Primary Examiner—Robert E. Bagwill
Attorneys—John M. Nolan, Harold M. Knoth, William A. Murray and H. Vincent Harsha ABSTRACT: A plow construction in which the portion of the plow standard carrying the plow bottom may swing upwardly and rearwardly upon encountering an obstruction, there being a fluid cylinder mounted between the plow frame and the upper end of the standard operable to reset the plow standard after the obstruction is passed. A hydraulic line interconnects the fluid cylinder to a tractor-mounted variable displacement pump which maintains the fluid under pressure. A relief valve in the line permits fluid to be dumped into a reservoir when an obstruction is encountered.

INVENTORS.
L. G. ARNOLD
OREY W. OERMAN
BY
John C. Thompson
ATTORNEY

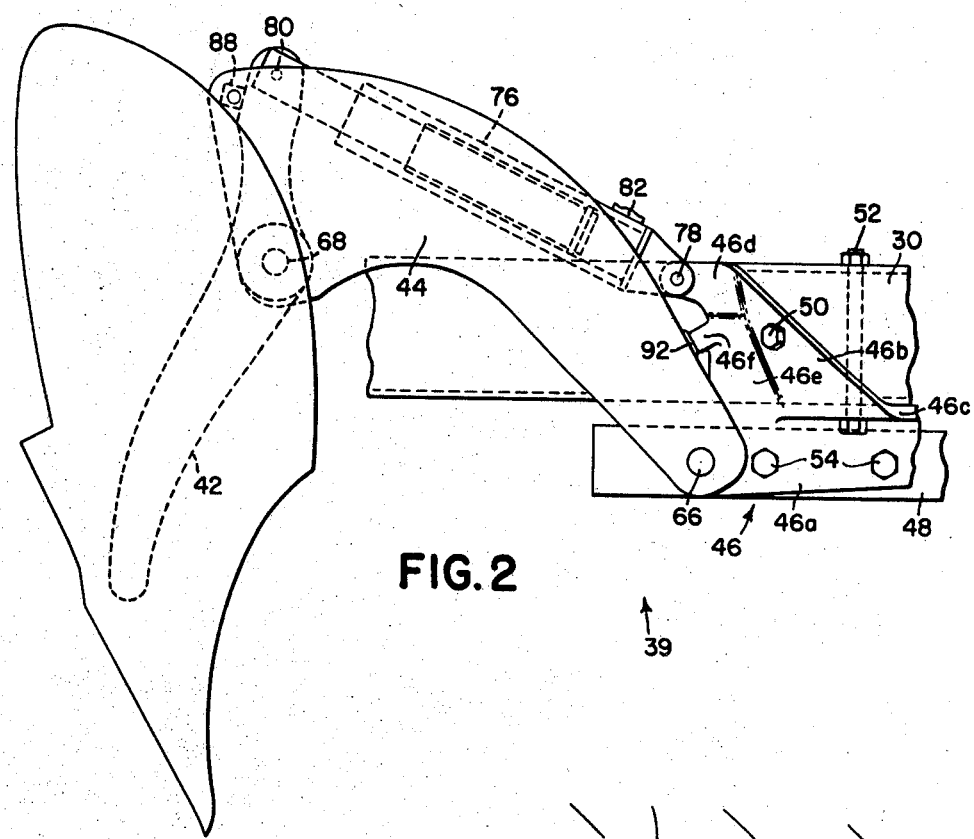
FIG. 2
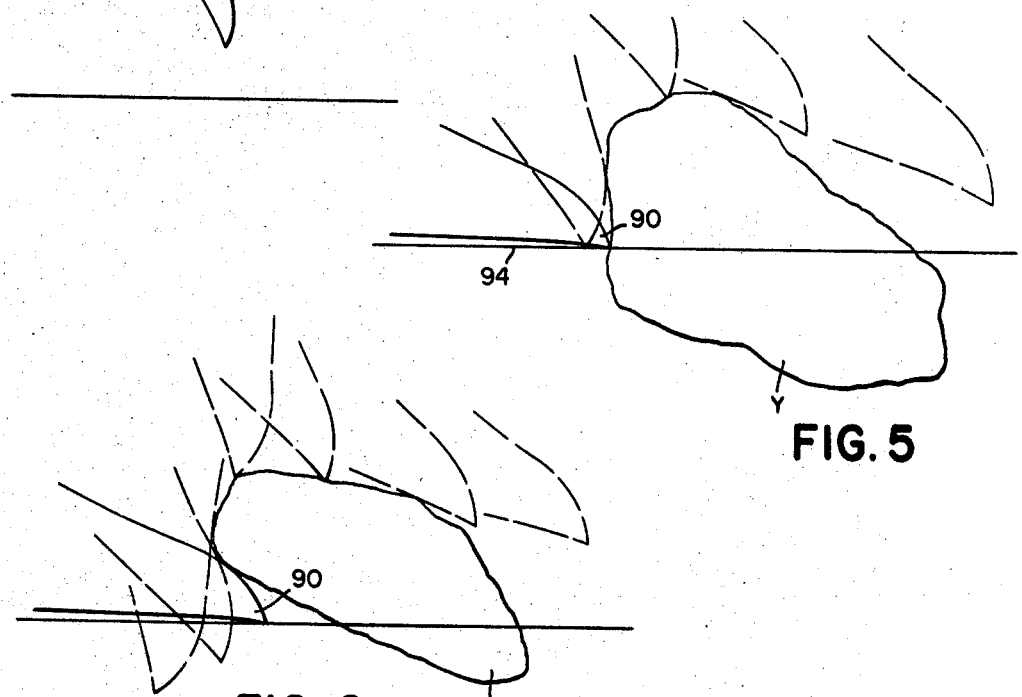
FIG. 5
FIG. 6
INVENTORS.
L. G. ARNOLD
OREY W. OERMAN
BY
John C. Thompson
ATTORNEY

PATENTED FEB23 1971

INVENTORS.
L. G. ARNOLD
OREY W. OERMAN

BY

*John C. Thompson*

ATTORNEY

PLOW CONSTRUCTION

The present invention relates in general to agricultural implements and more particularly to plows having a plurality of plow bottoms which may be tripped and automatically reset.

One object of the present invention is to provide a simplified hydraulic plow for use with a farm tractor having a variable displacement pump capable of supplying fluid under substantially constant pressure at varying rates.

A further object of the present invention is to provide a plow having a plurality of bottoms mounted thereon, each of the bottom mounting means including an improved trip and automatic reset device.

These and other objects and advantages of this invention will be apparent to those skilled in the art after a consideration of the following detailed description taken in conjunction with the accompanying drawings, in which the preferred form of this invention is illustrated.

FIG. 2 is a view similar to FIG. 1 in which the plow bottom is shown in a partially tripped position.

FIGS. 4, 5 and 6 show the a manner in which a plow bottom is tripped as it encounters various forms of obstruction during plowing.

In the following description right-hand and left-hand reference is determined by standing to the rear of the plow and facing the direction of travel.

Figure 3:
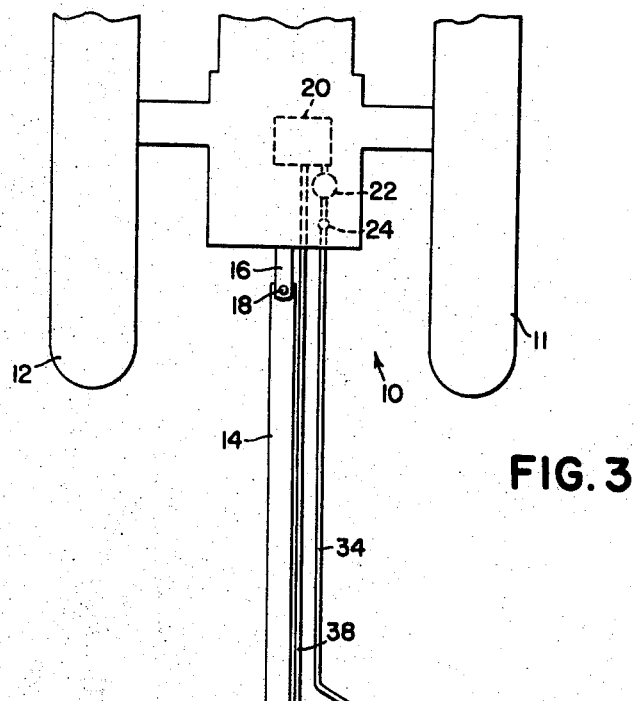
FIG. 3 is a generally schematic plan view of the hydraulic plow of this invention associated with a tractor having a variable displacement pump.

Referring first to FIG. 3, a farm tractor 10 having spaced apart right and left rear wheels 11, 12 is shown to which a plow, indicated generally at 13, is secured by means of a forwardly extending hitch 14, which is secured at its forward end to the drawbar 16 of the tractor by means of a conventional pin 18. The farm tractor is of the type having a variable displacement pump capable of supplying fluid under substantially constant pressure at varying rates, such as per example a John Deere 3020 or 4020 Tractor. Thus the tractor is equipped with a fluid reservoir 20, a variable displacement pump capable of supplying fluid under substantially constant pressure 22, and a valve 24. The pump is of the type shown in U.S. Pat. No. 3,002,462 to Raymond issued Oct. 3, 1961.

The plow 13 is provided with an obliquely extending main frame member 30 that carriers a hydraulic manifold 32. This manifold is interconnected with the pump 22 on the tractor by means of a flexible fluid line 34 and a relief valve 36 which is mounted on the frame member 30. The relief valve 36 is also interconnected with the reservoir 20 by means of a flexible fluid discharge line.

A plurality of mounting means, indicated generally at 39, are mounted on the main frame 30, each of the mounting means carrying a plow bottom 40.

Each of the mounting means 39 includes a standard 42, a mounting beam 44, an attaching bracket or casting, indicated generally at 46, and a longitudinally extending bar 48, which carries at its forward end a coulter (not shown).

The casting 46 is formed with a generally longitudinally extending vertically disposed lower portion 46a, whose rear end is coextensive with the rear end of the bar 48, an upper forward vertical obliquely extending portion 46b, a generally triangularly shaped horizontal web portion 46c disposed between the forward portion 46b and the front part of the lower portion 46a, and an upper longitudinally extending rear portion that has an apertured upper area 46d that is vertical, and a lower area 46e that when viewed from the rear extends upwardly and to the left, this last portion being provided with a stop 46f. The casting 46 is secured to the obliquely extending beam 30 by means of a fastener 50 which passes in part through portion 46b and also by a fastener 52 which passes in part through web 46c. The longitudinally extending bar 48 is secured to the lower portion by 46a by means of fasteners 54.

Figures 1, 7:
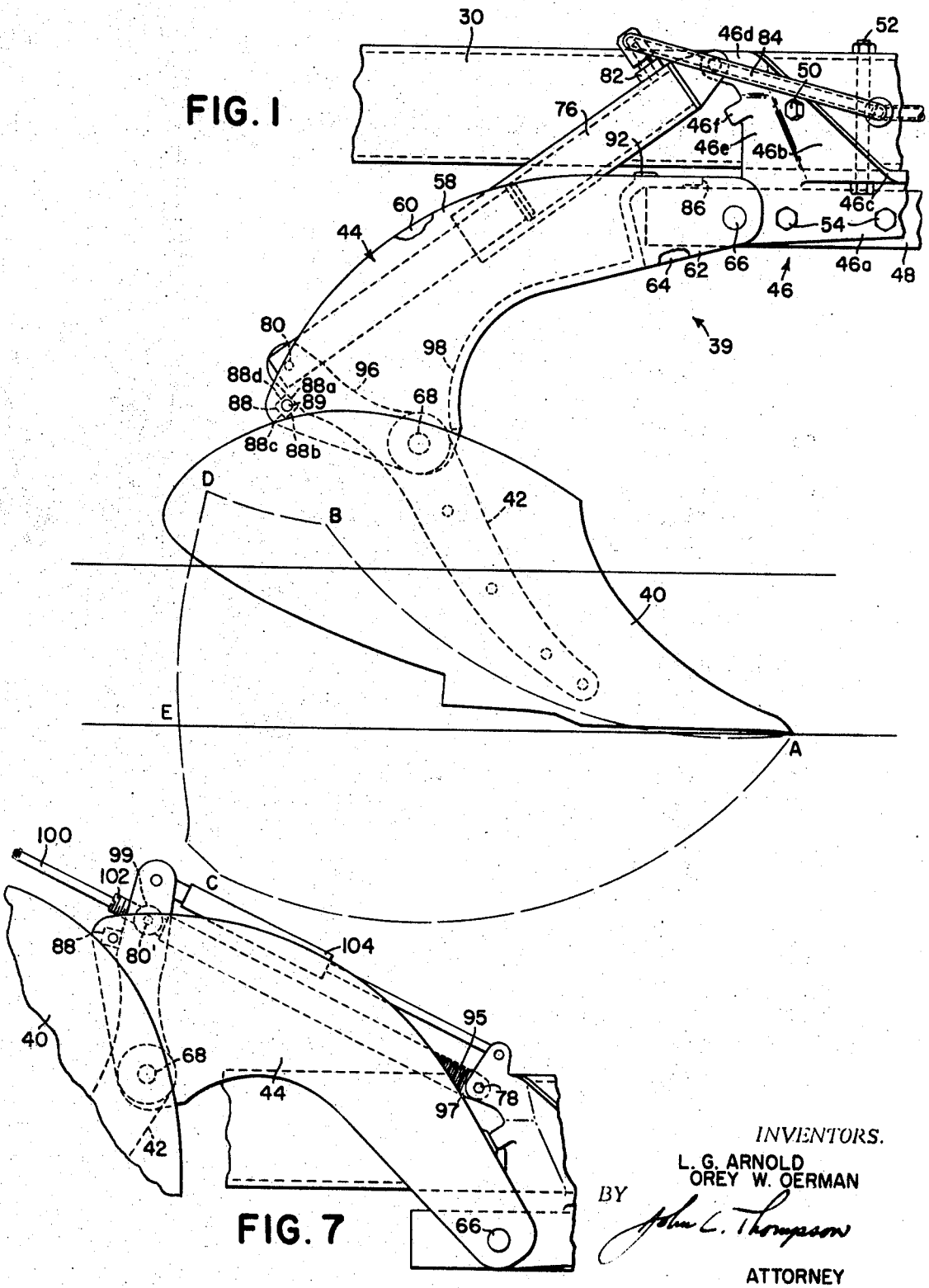
FIG. 1 is a side view of a portion of the plow showing in full lines a hydraulic trip and reset plow bottom in its working or plowing position and showing in broken lines that area that the point of the plow bottom may move through when tripped.
FIG. 7 is a view similar to FIG. 2 showing a plow bottom construction in which a spring construction is employed to reset the plow after tripping.

As can best be seen from FIG. 1 the mounting beam 44 is made of spaced apart plates 58 and 60 which have forwardly projecting spaced apart ears 62, 64, respectively. The spaced apart ears 62, 64 are disposed on opposite sides of the rearward portion of the bar 48 and receive the rear portion of the bar 48 and the lower portion 46a therebetween. A first pivot pin 66 is received within apertures in the ears 62, 64, the bar 48, and the rearward portion of the lower portion 46a and secures the beam for swinging movement. An intermediate portion of the standard 42 is received between the rear ends of the spaced apart plates 58, 60 and is secured to the plates for swinging movement by means of a second pivot pin or bolt 68. The bottom 40 is in turn rigidly secured to the standard 42 in a conventional manner.

A single-acting hydraulic cylinder 76 is interconnected with the upper area 46d of the upper rear portion of the casting 46 and the upper end of the standard 42. To this end the area 46d is apertured and receives a third pivot pin 78 which carries the forward end of the cylinder 76. Similarly the upper end of the standard is apertured and receives a fourth pivot pin 80 that carries the rear end of the cylinder 76. The cylinder 76 is provided with a discharge port 82 which is interconnected with the manifold 32 by means of a flexible fluid line 84.

In normal operation the bottom 40 is held in the position shown in FIG. 1 by the cylinder 76 which receives lu fluid under pressure from the pump 22, the pressure in the cylinder being sufficiently great to overcome the rearward and upward forces normally exerted upon the bottom during plowing. In this position the mounting beam is held with the stop 86 (which interconnects the ears 62, 64) in engagement with the upper surface of the rear portion of the bar 48 and the upper rear surface of the lower portion 46a whereby counterclockwise rotation is restricted. Similarly the standard 42 is held from counterclockwise rotation by engagement of the upper end of the standard with the stop 88 that is mounted between the plates 58, 60. The stop 88 is provided with four surfaces 88a, 88b, 88c and 88d which are located at varying distances from the pin 89. By rotating the stop to varying positions the attitude of the standard 42 may be changed, resulting in adding or decreasing the amount of suction in the plow bottom.

When the plow is held in the position shown in FIG. 1 the pump displaces no more fluid than is necessary to maintain the pressure within the hydraulic circuit, as for example, 2200 pounds per square inch. The relief valve 36 is set to pass fluid back to the reservoir 20 when the pressure exceeds 2800 pounds per square inch and thus there will normally be no flow through the line 38. If the plow bottom encounters an obstruction the bottom increases the pressure within the manifold up to relief valve pressure by displacing oil in the cylinder 76 into the manifold. The relief valve, which is set at a predetermined pressure above normal pump pressure, opens letting the displaced oil from the cylinder flow through the return hose into the oil reservoir 20. After passing over the obstruction, the oil pressure drops to a level below that normally maintained within the hydraulic system which will cause the variable displacement pump to pump oil into the manifold, extending the cylinder, and pushing the bottom back into working position.

The point 90 of the plow bottom will move along the line AB when an obstruction is encountered if the mounting means swings solely about the first pivot 66, along the line AC if the mounting means swings solely about the second pivot 68, or anywhere within the area ABDEC if there is a compound movement about the first and second pivots 66, 68. It should be noted that the high first pivot 66 allows the bottom to swing back and up without raising the plow frame, while the low second pivot 68 permits the point to release when it is hooked under an obstruction. The operation will be clearer from a study of FIGS. 4—6.

Figure 4:
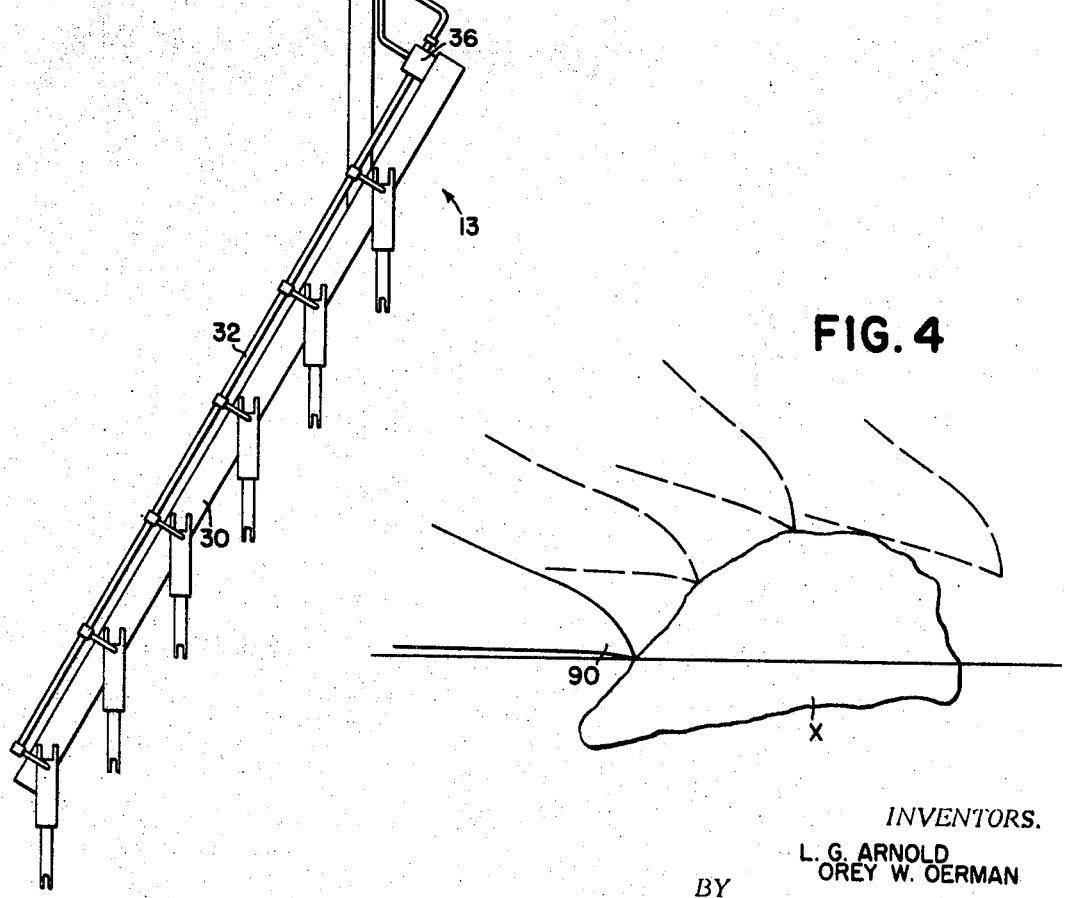

Referring first to FIG. 4, it should be noted than when an obstruction such as rock X is encountered by one of the plow bottoms that permits the point to slide upwardly the point 90 will follow the line AB until the obstruction is passed, and then return along the same arc or line to the working position. If the obstruction is not passed by the time the point 90 reaches B, at which point stop 92 engages stop 46f, further rearward movement will be along the line DB as the bottom pivots about 68.

When the point 90 hits an obstruction such as rock Y shown in FIG. 5, which does not permit the point to float up, the point will move along the line AE (i.e., the furrow bottom 94) until it approaches the line CD when it will swing rearwardly and upwardly about the pivot 68 up and over the obstruction along line DE. When the point 90 clears the top of the rock Y it will return to the plowing position along the lines DB and BA. It should be noted at this point that in order to make the trip reset when the bottom has rotated about both the first and second pivots 66, 68 without interrupting the forward motion of the plow the moments about the pivot points must be such that the moment about the second pivot point 68 is greater than the moment about the first pivot point during resetting. This is required in order to reset the bottom into the working position, after it has passed over the obstruction. The greater moment at 68 returns the standard until the upper surface of the standard engages the stop 88 carried by the lower rearward end of the mounting beam 44. Then the entire assembly pivots about the pivot 66 until the stop 86 engages the upper surface of 48, 46a.

Finally it should be noted that when the point 90 hooks under an obstruction, such as shown in FIG. 6, that the point will move solely about the second pivot point 68 along line AC until such time as the point releases at which time further movement of the point will be substantially about first pivot point 66. Rearward swinging movement solely about pivot 68 is limited by contact of the upper surface 96 of the standard 42 with the surface 98 of the web which interconnects the spaced apart plates 58, 60.

In FIG. 7 a modified construction is illustrated in which a spring assembly of the type illustrated in U.S. Pat. No. 3,347,540 issued Oct. 17, 1967 is employed instead of the hydraulic cylinder. The spring includes a plurality of Belleville washers slidably 95 slidably disposed about a stack rod 100 and held in place between an abutment portion 97 and a sleeve 102 which is threaded through a nut 99 which is secured to opposed pivots 80'. The abutment portion 97 is apertured and receives the third pivot pin 78 which holds one end of the stack rod, the other end of the stack rod being slidably disposed in sleeve 102. When the plow bottom with the spring assembly of FIG. 7 is in its normal plowing position. The sleeve 98 is adjusted within the nut 99 to vary the compression of the washers 95 which will give the desired preload which should be sufficient to hold the plow in plowing position during unobstructed plowing but should permit rearward swinging when an obstruction is encountered, the spring force being sufficient to reset the plow after the obstruction has been passed.

In many plowing conditions it is necessary to slow the return rate of the bottom when resetting to prevent unnecessary damage to parts of the bottom and to this end a shock absorber 104 may be provided.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

We claim:

1. In a ground-working implement the combination of a frame adapted to be moved forwardly over the ground, a plurality of earth-working tools, and a plurality of interconnecting means normally holding said tools in a forward lower ground-working position but permitting movement of said tools to an upper rearward displaced position, each of said interconnecting means comprising a mounting beam, first pivot means connecting a forward upper portion of said mounting beam to said frame for swinging movement about a generally transverse axis, first stop means on an upper portion of said mounting beam for engagement with said frame to limit swinging of the lower portion of said mounting beam in a forward direction, a tool standard, means rigidly securing one of said ground-working tools to the lower end of said tool standard, second pivot means interconnecting an intermediate portion of said standard to the lower portion of said mounting beam for swinging movement about a generally transverse axis, second stop means on a lower portion of said mounting beam for engagement with said tool standard to limit swinging of the lower end of the standard in a forward direction, a yieldable force-applying structure, third pivot means interconnecting a forward upper portion of said yieldable structure to said frame for swinging movement about a generally transverse axis and fourth pivot means interconnecting a lower rear portion of said yieldable structure to the upper end of said tool standard for swinging movement about a transverse axis, said yieldable force-applying structure when extended holding said first and second stop means on said beam against the frame and standard, respectively, whereby the tool will be held in its ground-working position, said yieldable force-applying structure permitting upward and rearward movement of said tool from its normal working position should an obstacle be encountered, the moment about the second pivot means being greater than the moment about the first pivot means so that when resetting after the tool has moved from its normal working position about both the first and second pivot means, the tool will rotate first about the second pivot means until the second stop means is engaged with the standard and then about the first pivot means.

2. The implement set forth in claim 1 in which said yieldable force-applying structure comprises an extensible and retractable hydraulic motor.

3. The implement set forth in claim 1 in which said yieldable force-applying structure comprises a compressible spring assembly.

4. The implement set forth in claim 3 in which said compressible spring assembly includes a plurality of Belleville washers.

5. The implement set forth in claim 1 in which means are provided to reset the bottom at a controlled rate.

6. The implement set forth in claim 1 in which the second stop means is adjustable.

7. The combination with a tractor having a fluid reservoir and a variable displacement pump capable of supplying fluid under substantially constant pressure at varying rates upon demand of an earth-working implement having a frame, draft means securing the implement frame to the tractor whereby the implement will be propelled forwardly in response to forward movement of the tractor, a plurality of earth-working tools, and a plurality of means interconnecting said tools with the frame and operable to normally hold said tools in a forward lower ground-working position but permitting movement of said tools to an upper rearward displaced position, each of said interconnecting means including a single-acting hydraulic cylinder, a common manifold interconnecting all the single acting cylinders on said implement, a fluid supply line interconnecting the manifold with said pump whereby said single-acting cylinders are normally extended to hold said tools in their normal working position, a relief valve in communication with said manifold and set at a higher pressure than that supplied by said pump, and a fluid line interconnecting said relief valve with said reservoir, the parts being so arranged and constructed that when during use should a tool strike an obstruction, the tool may move rearwardly and upwardly against the fluid pressure within the cylinder, the excess fluid being discharged directly into the reservoir in the tractor through the relief valve and its associated fluid line.

8. The combination with a tractor having a fluid reservoir and a variable displacement pump capable of supplying fluid under substantially constant pressure at varying rates upon demand of an earth-working implement having a frame, draft means securing the implement frame to the tractor whereby the implement will be propelled forwardly in response to forward movement of the tractor, a plurality of earth-working tools, and a plurality of means interconnecting said tools with the frame and operable to normally hold said tools in a forward lower ground-working position but permitting movement of said tools to an upper rearward displaced position, each of said interconnecting means including a hydraulic cylinder, a common manifold interconnecting all the cylinders on said implement, a fluid supply line interconnecting the manifold with said pump whereby said cylinders are normally extended to hold said tools in their normal working position, a relief valve in communication with said manifold and set at a higher pressure than that supplied by said pump, and a fluid line interconnecting said relief valve with the reservoir, said interconnecting means including a mounting beam, first pivot means interconnecting a forward portion of said mounting beam to said frame for swinging movement about a generally transverse axis, first stop means on an upper portion of said mounting beam for engagement with said frame to limit swinging of the lower portion of said mounting beam in a forward direction, a standard, means rigidly securing a tool to the lower end of said standard, second pivot means interconnecting an intermediate portion of said standard to the lower portion of said mounting beam for swinging movement about a generally transverse axis, second stop means on a lower portion of said mounting beam for engagement with said standard to limit swinging of the lower end of the standard in a forward direction, third pivot means interconnecting a forward upper portion of said hydraulic cylinder to said frame for swinging movement about a generally transverse axis, and fourth pivot means interconnecting a lower rear portion of said hydraulic cylinder to the upper end of said standard for swinging movement about a transverse axis, the parts being so arranged and constructed that when during use should a tool strike an obstruction, the tool may move rearwardly and upwardly against the fluid pressure within the cylinder, the excess fluid being discharged into the reservoir in the tractor through the relief valve and its associated fluid line.

9. A plow comprising a frame adapted to be propelled forwardly over the ground, link means swingably secured to said frame and movable between a lower forward working position and an upper rearward tripped position, first stop means between said link means and said frame to limit the movement in a lower forward direction, a bottom assembly including a plow bottom swingably secured to said link means and movable in the same manner as the link means between a forward working position and a rear tripped position, second stop means between said bottom assembly and said link means to limit the forward swinging of said bottom means, and extensible and retractable force-applying means pivotally secured at opposite end portions to said frame and said bottom assembly to normally hold said link means and said bottom assembly in their working position, said second stop means being adjustable whereby the attitude of the bottom assembly may be varied to vary the suction of the plow bottom.

10. In a plow the combination of a frame adapted to be moved forwardly over the ground, a plow bottom, and interconnecting means normally holding said plow bottom in a forward lower ground-working position but permitting movement of said plow bottom to an upper rearward displaced position, said interconnecting means comprising a mounting beam, first pivot means connecting a forward upper portion of said mounting beam to said frame for swinging movement about a generally transverse axis, a standard, means rigidly securing said plow bottom to the lower end of said standard, second pivot means interconnecting an intermediate portion of said standard to the lower portion of said mounting beam to permit rearward swinging movement, means acting between the upper end of the standard and the frame to normally hold the plow bottom in the forward lower ground-working position but yieldable to permit upward and rearward movement of said plow bottom from its normal working position should an obstacle be encountered, said last mentioned means acting to reset the plow bottom after it has been tripped, and when tripped about both pivots to swing the standard about its point of pivotal connection with the mounting beam until the plow is disposed in an attitude conducive to penetration of the plow unit into the ground and subsequently to swing the mounting beam about its point of pivotal connection with the frame.

11. The plow set forth in claim 10 in which said last mentioned means includes collapsible link means pivotally interconnected at its ends with the top end of said standard and a portion of the frame, the link means being in its collapsed position when the standard and mounting beam have been swung upwardly and rearwardly about their points of pivotal interconnection, and being in its uncollapsed position when the plow is in its normal ground-working position.

12. The plow set forth in claim 11 in which said collapsible link means comprises an extensible and retractable hydraulic motor.

13. The plow set forth in claim 11 in which said collapsible link means comprises a compressible spring assembly.

14. A plow comprising a frame adapted to be propelled forwardly over the ground, link means swingably secured to said frame and movable between a lower forward working position and an upper rearward tripped position, first stop means between said link means and said frame to limit the movement in a lower forward direction, a bottom assembly including a plow bottom swingably secured to said link means and movable in the same manner as the link means between a forward working position and a rear tripped position, second stop means between said bottom assembly and said link means to limit the forward swinging of said bottom means, and force-applying means having relatively extensible and retractable portions pivotally secured to said frame and said bottom assembly to normally hold said link means and said bottom assembly in their working position, said second stop means being adjustable whereby the attitude of the bottom assembly may be varied to vary the suction of the plow bottom.

15. In a plow the combination of a frame adapted to be moved forwardly over the ground, a plow bottom, and interconnecting means normally holding said plow bottom in a forward lower ground-working position but permitting movement of said plow bottom to an upper rearward displaced position, said interconnecting means comprising a mounting beam, first pivot means connecting a forward upper portion of said mounting beam to said frame for swinging movement about a generally transverse axis, a standard, means rigidly securing said plow bottom to the lower end of said standard, second pivot means interconnecting an intermediate portion of said standard to the lower portion of said mounting beam to permit rearward swinging movement, means acting between the upper end of the standard and the frame to normally hold the plow bottom in the forward lower ground-working position but yieldable to permit upward and rearward movement of said plow bottom from its normal working position should an obstacle be encountered, said last mentioned means acting to reset the plow bottom after it has been tripped, and when tripped about both pivots to swing the standard about its point of pivotal connection with the mounting beam until the plow is disposed in an attitude conducive to penetration of the plow unit into the ground and subsequently to swing the mounting beam about its point of pivotal connection with the frame, said last mentioned means including collapsible link means pivotally interconnected with the top end of said standard and a portion of the frame, the link means being in its collapsed position when the standard and mounting beam have been swung upwardly and rearwardly about their points of pivotal interconnection, and being in its uncollapsed position when the plow is in its normal ground-working position.

16. In a plow the combination of a frame adapted to be moved forwardly over the ground, a plow bottom, and interconnecting means normally holding said plow bottom in a forward lower ground-working position but permitting movement of said plow bottom to an upper rearward displaced position, said interconnecting means comprising a mounting beam, first pivot means connecting a forward upper portion of said mounting beam to said frame for swinging movement about a generally transverse axis, a standard having a forward portion with second pivot means thereon interconnecting it to a lower portion of said mounting beam for swinging movement between a forward working position and a rear tripped position, said standard further having a rearwardly projecting portion integral with and extending from the forward portion and having a third pivot means thereon, means rigidly securing said plow bottom to the forward portion of said standard, means acting between the third pivot means and the frame to normally hold the plow bottom in the forward lower ground-working position but yieldable to permit upward and rearward movement of said plow bottom from its normal working position should an obstacle be encountered, said last-mentioned means acting to reset the plow bottom after it has been tripped, and when tripped about both the first and second pivot means to swing the standard about its point of pivotal connection with the mounting beam until the plow is disposed in an attitude conducive to penetration of the plow unit into the ground and subsequently to swing the mounting beam about its point of pivotal connection with the frame.